Oct. 10, 1933. E. McCORMICK 1,929,646
STEERING MECHANISM
Filed Dec. 11, 1929
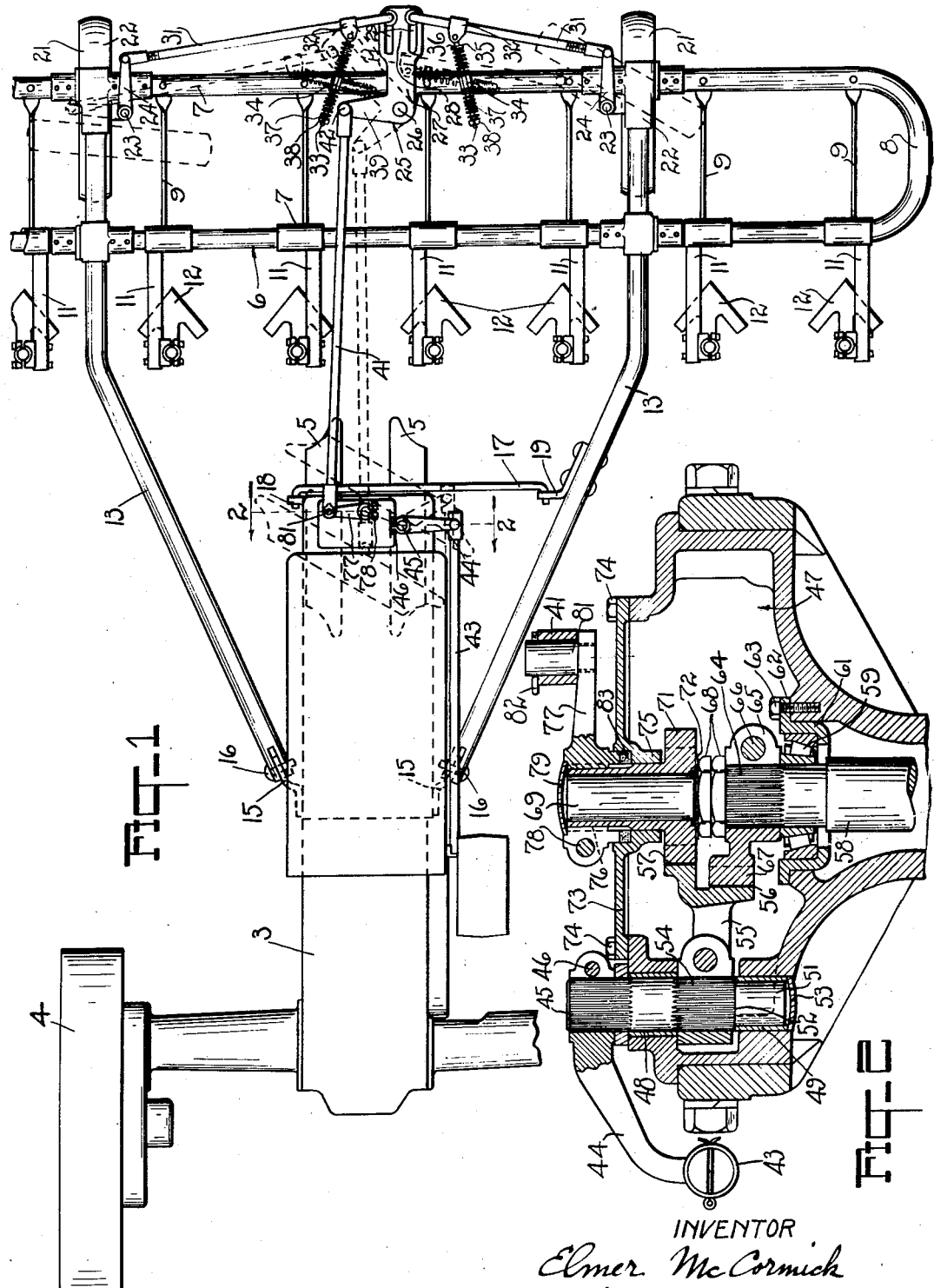
WITNESS
A. D. McLeay.
INVENTOR
Elmer McCormick
BY Brown, Jackson, Boettcher & Denner
ATTORNEYS Patented Oct. 10, 1933

1,929,646

UNITED STATES PATENT OFFICE 1,929,646

STEERING MECHANISM

Elmer McCormick, Waterloo, Iowa, assignor to John Deere Tractor Company, Waterloo, Iowa, a corporation of Iowa Application December 11, 1929
Serial No. 413,212

21 Claims. (Cl. 280—91)

This invention relates to steering mechanisms and more particularly to a steering arrangement for tractor propelled machines in the nature of attachments, and may be characterized as an improvement on the device disclosed in the co-pending application of Frank T. Court, Serial No. 160,183, filed January 10, 1927, for Control mechanism for tractor driven implements.

The instant invention is directed particularly to a steering mechanism for tractor propelled machines comprising a tractor having steering means at the front and propelling means at the rear, and an attachment in the form of a frame supported on dirigible wheels, the frame being located in advance of the tractor and connected therewith to be pushed thereby, the connections being such as to permit the frame to have relative vertical movement with respect to the tractor.

So far as the present invention is concerned, while I have shown the pushed frame as supporting a cultivator, it is immaterial whether the pushed frame carries soil treating tools, excavating or scraping tools, harvesting tools, or is of general utility for carrying any useful load, as the invention is particularly directed to an improved steering means whereby the operator of the combined tractor and implement or frame may easily and positively guide the combined machine, either straight away or in turning, the course of the steering wheels being differentially controlled to properly guide the machine.

It is well known, that in self-propelled vehicles it is desirable that the usual steering wheels be capable of differential movement with respect to each other in making a turn, so that the inner wheel may turn to a more acute angle than the outer wheel, to permit both wheels to follow arcs having a common center, or approximately so, and this is equally true of the proper steering of two sets of wheels on any vehicle or implement tractor combination, so that the two sets of wheels must be so guided that the turning radii of all the wheels intersect approximately at a point on a line with the axis of the rear or driving wheels of the combination.

In the copending application above noted there is a provision for differentially steering all the steering wheels of a combined machine of the character above referred to, whether the steering wheels of the pushed frame or attachment be located normally in line with the steering wheel or wheels of the tractor, or be differently spaced with respect thereto. The steering control mechanism is so arranged that the inside steering wheel of the attachment frame will be positively held at a desired angle in executing a turn, while the corresponding outside wheel will be yieldingly controlled but will nevertheless be held approximately in the proper angular relation to the inside wheel to cause it to follow the appropriate arc. This is accomplished by the holding of the outside wheel under spring tension at a greater degree of angularity than its normal differential movement, the purpose of which is to throw more of the traction on the outside wheel so that it will aid in changing the course of the vehicle, the construction and arrangement being especially advantageous when the combined machine is traveling over loose soil.

While the arrangement above referred to when applied to a wide tread tractor approximates the desired action on sweeping turns, on very sharp turns the structure tends to turn the forwardmost set of wheels a little more than is necessary for proper differential relationship. I have discovered that by introducing a gear reduction between the drag link which controls the front wheels of the tractor and the drag link which controls the dirigible wheels of the implement, the error in making short or sharp turns is obviated.

With the above in view, it is the main object of this invention to provide a steering mechanism for tractor and pushed implement frame combinations wherein a gear reduction is provided between the drag link of the tractor and the drag link which controls the forwardmost wheels of the combination, whereby the steering wheels of a combined machine of the character above referred to are differentially steered so that all the steering wheels are so guided that the turning center of all the wheels occurs approximately at a point on a line with the axis of the rear or driving wheels in all relative movements of the combination in making turns whether they be sweeping or very sharp. This is accomplished by the provision of a reduction gear arrangement whereby movement imparted to the tractor drag link is transmitted to the tractor steering wheels at one ratio while the motion transmitted to the drag link operating the implement or frame steering wheels is transmitted thereto at a greater ratio.

Another object is the provision of such a gear reduction means as will impart or transmit to the forwardmost steering wheels of the combination an appreciable amount of angularity during the first portion of the steering movement, while only a small amount of angularity is imparted to these steering wheels during the last portion of the steering movement. This is accomplished by the provision of a lever or arm connected to the rear end of the drag link transmitting movement to the forwardmost wheels of the combination and actuating this link in such a manner that the effective end of the lever imparts an appreciable longitudinal movement to the drag link at the beginning of the steering movement of such wheels, while only a small amount of longitudinal movement is imparted to said drag link during the last portion of longitudinal movement thereof. By this arrangement, when the combination is making a relatively sharp turn, a comparatively large amount of angularity is transmitted to the steering wheels at the forwardmost end of the combination during the first portion of angular displacement of said wheels, while only a relatively small amount of angularity is transmitted to said wheels during the last portion of movement of said wheels as the wheels approach the maximum or limit of angularity which may be imparted thereto.

A further object is the provision of a novel gear reducing means wherein the steering spindle of the front wheels of the tractor is turned to impart swinging movement to said wheels and concurrently therewith the means acting thereupon is adapted to act upon the means transmitting angular movement to the frame steering means at a greater ratio of movement. This is accomplished by the provision of a gear sector operated by the drag link of the tractor steering mechanism having two sets of teeth thereon, one set being adapted to coact with a sector operatively associated with the steering wheels of the tractor and the other being adapted to cooperate with a gear associated with the drag link operating the forwardmost steering wheels. The gear ratio between the gear teeth on the sector cooperating with the sector on the tractor steering spindle is less than the ratio between that portion of the sector cooperating with the gear transmitting motion to the drag link associated with the forwardmost steering wheels, whereby the last named gear member is adapted to be rotated through a greater angle than the first mentioned gear for the same amount of angular displacement of said sector.

Another object is the provision of a novel arrangement whereby the tractor drag link is given a uniform motion during any period of movement thereof to impart angularity to the steering wheels of the tractor, and to concurrently impart a non-uniform or decelerating motion to the drag link controlling the angular movement of the forwardmost or implement wheels during that period. The arm cooperating with the implement drag link assumes a position approximating a right angle relative to the drag link when the vehicle is traveling in a straight-away direction, and is adapted to rotate in either direction through an angle approximating 90°, the limit of movement in either direction being an alignment of the arm with the drag link.

Thus during the first portion of angular movement of said arm a relatively large amount of longitudinal motion is transmitted to said drag link, while during the latter portion of angular movement of said arm approximating alignment of the arm and drag link the longitudinal motion of the drag link is less. The relative movements of the two drag links is such when uniform motion is imparted to the tractor drag link a non-uniform or decelerating motion is imparted to the implement drag link in making a turn, and conversely an non-uniform or accelerating motion is imparted to said last named link when the combination is coming out of a turn for a straightaway course.

A further object is the provision of a novel gear reduction arrangement which is simple, positive in operation, and compact. The gear reduction means is so arranged that the tractor drag link operated sector may cooperate with the tractor steering wheel spindle sector and concurrently with the gear controlling the arm in turn transmitting motion to the implement drag link. One of the novel features of the gear reduction arrangement is the mounting of the implement drag link control gear in such a manner that the tractor wheel steering spindle is utilized as a bearing for said gear. This construction is believed to be novel and results in a simple and compact, yet substantial structure.

Other and further objects will appear from the following detailed description of a preferred embodiment of my invention illustrated in the accompanying drawing in which:

Figure 1 is a fragmentary plan view of a tractor implement combination showing a portion of a cultivator attached to the tractor, illustrating in full lines the steering system in the position assumed when the combination is traveling straight ahead, and in dotted lines the position assumed when making a very sharp turn, and Figure 2 is an enlarged cross sectional view of the reduction gear arrangement taken along the line 2—2 of Figure 1.

Although this application is concerned only with the steering mechanism, for the sake of clarity certain other parts of the particular tractor and cultivator attachment shown, will be described.

In Figure 1 of the drawing I have illustrated a wide tread tractor 3 having rear driving wheels 4 (only one of which is shown) and dirigible or steering wheels 5. A cultivator attachment 6 comprises transverse tubular members 7, one of which is bent at its ends to form side members 8 (only one of which is shown) spaced apart slightly more than the width of the tractor, the transverse members 7 being reinforced by braces 9 forming the frame thereof.

The rear transverse members 7 is provided with a series of rearwardly and downwardly depending bars 11 supporting the usual cultivator shovels 12 at their lower ends. The cultivator frame is pivotally connected to the tractor by two longitudinal rearwardly disposed converging tubular members 13 having pivotal connection with suitably secured brackets 15 by bolts or pins 16. A tie rod 17 having its ends bent at right angles to the body portion thereof with one end pivotally mounted in a lug 18 and its other end pivotally connected to a suitably secured bracket 19 carried by one of the supporting members 13 serves to maintain the center of the cultivator in alignment with the longitudinal center of the tractor.

A pair of dirigible wheels 21 are pivotally supported at the forwardmost portion of the cultivator frame by brackets 22 which are secured to the frame at the juncture of the front transverse member 7 and the supporting members 13. Swivels 23 are supported in the brackets 22 for horizontal pivotal movement and at their upper ends carry horizontally disposed arms 24. A bell crank lever 25 is supported for horizontal pivotal movement upon the front transverse frame member 7 about a pivot 26, the pivot being positioned slightly to one side of the longitudinal center of the cultivator. One arm 27 of the bell crank 25 is provided at its end with an enlarged portion 28 having provided therein two parallel, longitudinally disposed slots 29.

A tie rod 31 connects each of the arms 24 with the arm 27 of the bell crank 25, the inner ends of the tie rods 31 being bent downwardly and being slidably disposed in the slots 29. Tie rods 31 carry thereon and adjacent to the arm 27 of the bell crank 25, brackets 32, which, at their rear portions, are pivotally connected to slip rods 33 slidably mounted at opposite sides of the bell crank 25 in the legs of U-shaped guides 34 pivotally mounted on the front transverse frame member 7. Mounted on each slip rod, between its guide 34 and a washer 35 supported on the rod adjacent to the pivotal connection of the rod with its bracket 32, is a coiled spring 36. A similar spring 37 is mounted on each slip rod 33 between its guide 34 and a nut 38 threaded upon the rear end of said rod. The two springs 36 and 37 on each slip rod cooperate with the guide 34 to hold the rod on which they are mounted normally in a neutral position. Obviously, when either slip rod is moved longitudinally through its guide 34 in one direction or the other, one or the other of its springs 36, 37 will be put under greater tension and the tension on the other spring will be reduced. Preferably, adjustments of these parts are such that when the steering wheels are directed straight ahead the inner ends of the connecting tie rods 31 will both be at the forward ends of their respective slots 29, as shown in Fig. 1, at which time the arm 27 of the bell crank 25 will extend straight forwardly in parallel relation to the wheels. In other words, in this condition the inner ends of the tie rods 31 will be at their greatest distance from the pivot 26 of the bell crank 25.

The other arm 39 of the bell crank 25 extends at right angles to the arm 27 and is pivotally connected at its end with a drag link 41, at 42, the drag link 41 extending rearwardly toward the tractor.

The steering of the tractor and implement is controlled from the usual steering wheel of the tractor (not shown) which is suitably connected through a worm and gear to a drag link 43. At its front end, the drag link 43 is connected in the well known manner to an arm 44. Arm 44 is adjustably secured to a spindle 45, the portion secured to the spindle being bifurcated and adapted to surround the spindle and engage longitudinal peripheral serrations thereon and being adapted to be clamped thereto by a bolt 46 which is adapted to draw the end portion of the arm tightly about the spindle.

Spindle 45 is rotatably journaled in a front wheel steering spindle housing 47, in spaced bushings 48 and 49, the former being mounted in the upper portion of the housing and the latter in the lower portion thereof. At its lower end, the spindle 45 is provided with a reduced portion 51 forming a collar 52 which is adapted to seat upon the upper end of the lower bearing 49. The lower end of bearing 49 is effectively sealed by a pressed metal concavo-convex cover member 53. The spindle 45 is provided with a serrated portion 54 between the bushings 48 and 49 and about which a sector 55 is clamped.

Sector 55 is provided at its curved edge with two sets of gear teeth 56 and 57. The usual steering spindle 58, which connects with the front tractor wheels 5, is positioned for rotation centrally of the housing 47 and is held in position in the housing by a tapered antifriction bearing 59, the outer race of which is seated in an inverted cup shaped member 61 having a peripheral flange 62 which is secured to the housing 47 by bolts 63. The portion of the spindle 58 adjacent to the bearing 59 is provided with longitudinal serrations 64 about which a gear sector 65 is clamped and retained thereon by a transverse bolt 66, the teeth 67 of this sector being in mesh with the teeth 56 of the sector 55. Sector 65 is positively retained on the spindle 58 by means of a pair of lock nuts 68.

The upper end of the spindle 58 is formed with a reduced portion 69, and a gear 71 having a hub or sleeve portion extending from one face thereof is rotatably journaled on this reduced portion 69 with the sleeve portion extending upwardly thereon and with the lower face of the gear 71 engaging a washer 72 which is seated slidably upon the upper one of the lock nuts 68. The teeth of the gear 71 are meshed with the gear teeth 57 of the sector 55. A cover member 73 is suitably secured to the top of the casing or housing 47 as by bolts 74 and is provided with a depending circular flange 75, the inner periphery of which is adapted to engage the outer periphery of the sleeve portion of the gear 71. The front dirigible wheels 5 of the tractor 3 are journaled on axle means carried by or turned in response to movement of the spindle 58 in the usual manner.

The reduced portion 69 of the spindle 58 and the hub or sleeve portion of the gear 71 are adapted to extend upwardly beyond the cover 73, and the upper end of the sleeve is provided with serrations 76 on its outer periphery. An arm 77 having a forked resilient clamping portion is seated upon the sleeve and is clamped thereabout, being secured thereto by a bolt 78 which is adapted to draw the resilient clamping portion tightly about the serrations. A sheet metal pressed cover 79 is sprung into a seat provided therefor on the arm at the clamping portion thereof to prevent dirt gaining access to the spindle 58. The swinging end of arm 77 is provided with an upstanding spindle portion 81 upon which the rear end of the drag link 41 is journaled, a cotter pin 82 passing diametrically through the spindle 81 adjacent to the end thereof preventing accidental displacement of the drag link 41 from the spindle 81. A felt washer 83 is positioned on the upper side of the depending flange 75 and between it and the lower side of the clamping portion of the arm 77 and embracing the sleeve of the gear 71 for purposes of retaining a lubricant and at the same time preventing dirt from gaining access into the housing 47.

The ratio between the gear teeth 56 on the sector 55 and the gear teeth 67 of the sector 65 is determined generally by the amount of rotation desired to be imparted to the steering spindle 58 by the rotation of the sector 55 upon its spindle 45. This ratio is usually 2 to 1 so that for a unit rotational angle of the sector 55, the sector 65 will have imparted thereto two units of angular rotation. For purposes of clarity, this ratio will be hereinafter termed as the "steering ratio".

The ratio between the gear teeth 57 of the sector 55 and the teeth of the gear 71, is greater than the steering ratio. Thus for a unit rotation of the sector 55, the sector 65 will move through a lesser number of units of angular movement than will the gear 71. In other words, as the sector 55 is rotated, it will impart to the steering spindle 58 a definite amount of rotation while the rotation to the gear 71 imparted by the sector 55 will be greater than the amount imparted to the steering spindle 58. As illustrating one relation of steering ratios which I have found to be effective for obtaining the stated objects of the invention, the arm 77 may be arranged to swing through 90° while the tractor steering wheels are swinging through 60°, as shown in dotted lines in Figure 1, but it will be understood that this relation may be departed from to some extent if desired.

The arm 77 is so secured to the sleeve of the gear 71 as to be positioned at right angles to the longitudinal center of the tractor when the steering wheels of the combination are set for straight forward movement.

Thus when the steering spindle 58 is rotated in either direction to steer the tractor wheels 5, as the arm 77 approaches its maximum angular disposition in either direction, the arm approaches coincidence with the longitudinal line of the drag link 41 as the limit of such movement. It will be evident that since the outer end of the arm 77 moves in an arc about the axis of the spindle 58 as a center, longitudinal movement imparted to the drag link 41 during the first portion of movement of the arm 77 will be appreciable, while as the arm 77 approaches its maximum rotational limit in either direction, the movement imparted to the drag link 41 will be appreciably less than during the first portion of rotational movement of the arm 77. In other words, for any given rotational speed of the arm 77, the endwise movement of the drag link 41 during the first portion of rotational movement of the arm 77 will be comparatively fast while during the last portion of rotational movement of the arm 77, the speed of longitudinal movement of the drag link 41 will be appreciably less, so that as the arm 77 moves in either direction to impart longitudinal movement to the drag link 41 the longitudinal speed of movement of the drag link 41 will be decelerated during any steering movement of the combination from the straight forward movement as shown in solid lines in Figure 1 to any turning movement of the combination in either direction.

In order to simplify the description of the movement of the dirigible wheels 21 of the implement, the wheel to the right of the tractor as viewed looking from the tractor forwardly thereof to the implement will be termed the "right hand wheel" while the other of said wheels will be termed the "left hand wheel".

When the arm 77 is rotated so as to impart a rearward longitudinal movement to the drag link 41, the bell crank lever 25 will be rotated toward the dotted line position indicated in Figure 1 of the drawing. The swinging of the arm 27 of the bell crank 25 in the direction described thrusts the connecting or tie rod 31 at the left hand side of the attachment toward the left, thereby imparting rotational movement to the arm 24 of the left hand wheel 21 about its swivel 23. At the same time this swinging of the arm 27 of the bell crank 25 pulls on the right hand tie rod 31 and accordingly the right hand steering wheel 21 of the attachment is also turned to the left. The movement of the two attachment steering wheels 21, however, is not uniform, but is differential in character, the left hand wheel being turned to a much sharper angular position with reference to the forwardmost transverse member 7 on which it is mounted than the right hand wheel, as clearly shown in the dotted line positions in Figure 1. This differential movement follows for the reason that the inner end of the left hand connecting or tie rod 31 is held in the outer or forward end of its slot 29 by its spring 36, the pressure of which is increased by the lateral movement of the arm 27 of the bell crank 25, since such lateral swinging moves the slip rod 33 rearwardly through its guide 34 and thereby compresses the spring 36.

It will be evident, that the distance the left hand tie rod 31 will be moved by swinging of the arm 27 through a given arc depends upon the distance between the pivot 26 and the point at which the tie rod is connected with the arm 27. The greater this distance, the further the tie rod will be moved. Consequently, by holding the inner end of the left hand tie rod 31 at the outer end of its slot 29, that is, at its greatest distance from the pivot 26, the maximum angular movement will be imparted to the left hand attachment steering wheel. In the case of the right hand attachment steering wheel, the tie rod 31 which controls its movement is not held at the outer end of its slot 29, but is permitted to move in said slot toward the pivot 26, and consequently the angular movement of the latter wheel is not as great. This results from the fact that when the arm 27 is swung to the left in the manner illustrated, the right hand slip rod 33 is caused to move forwardly through its guide 34, thereby increasing the tension of its spring 37 and relaxing the tension of the spring 36. The inner end of the right hand connecting rod 31 therefore moves rearwardly in its slot 29, that is, toward the pivot 26.

It does not, however, move to the rearward end of said slot, since such movement is resisted by its spring 36 to stop it in an intermediate position in said slot and hold it yieldingly in such position, the two pairs of springs being so adjusted as to give the attachment steering wheel at the inside of the turn the full angular movement necessary to cause it to travel in an arc about the common center of all the wheels, whereas the attachment steering wheel at the outside of the turn is given a differential angular movement somewhat greater than that necessary to cause it to travel in an arc about such common center, this result being obtained by causing the inner end of its tie rod 31 to move the appropriate distance from the outer end of its slot, that is, toward the pivot 26. The advantage of so doing is that the greater angularity of the outside wheel throws more of the traction on that wheel and consequently aids in the steering operation by relieving the inside wheel of part of its duty, such being of particular advantage in loose soil.

It will be evident that the differential action above described will occur when the steering wheels are turned in either direction, the wheel at the inside of the turn being turned to a greater degree of angularity than that at the outside of the turn. While the slots 29 have been shown as being parallel to each other, this is not essential.

The above described operation of the steering of the dirigible wheels 21 by means of the bell crank 25 and its associated connecting tie rods 31 and cooperating slip rods and springs takes place during the first portion of movement of the arm 77 about the steering spindle 58. As hereinbefore described, inasmuch as the longitudinal movement of the drag link 41 is decelerated as the arm 77 reaches the limit of its angular movement, it will be evident that during the latter portion of movement of the arm 77 the swinging movement of the dirigible wheels 21 will be appreciably less. Thus, as the dirigible wheels 21 approach the maximum turning movement thereof as a limit in making a very sharp turn of the combination, the wheels 21 are turned in such a manner as to have non-uniform differential movement relative to the steering wheels 5 of the tractor 3.

It will thus be seen that I have provided a novel arrangement for a steering mechanism of the character described whereby in making very sharp turns of a combination, such as is disclosed, the relationship between the steering movement of the two sets of steering wheels is such that for a uniform turning of the steering wheels of the tractor a non-uniform turning movement is imparted to the dirigible wheels of the implement carried by the tractor. By the novel construction, better guidance of the combination is obtained and undue strains and stresses which were heretofore imposed upon the dirigible wheels of such a combination, are entirely obviated for any type of turn and particularly in the case of very sharp turns.

While the arrangement has been illustrated as being applied to dirigible wheels of an implement mounted and adapted to be carried forwardly of the tractor, it will be evident that the mechanism is equally applicable to the steering of dirigible wheels supporting an attachment which may be mounted rearwardly of the tractor and adapted to be drawn thereby instead of being pushed thereby.

As hereinbefore stated, it will be understood that it is immaterial whether the attachment comprises a pushed frame carrying soil treating tools, excavating or scraping tools, harvesting tools, or is of general utility for carrying any useful load.

While I have disclosed a preferred embodiment of my invention, I do not wish to be limited thereto. As will be understood by those skilled in the art certain changes may be made therein without departing from the essence of the invention or the spirit and scope of the appended claims.

What I claim and desire to secure by Letters Patent is:

1. The combination with a tractor having dirigible wheels and a drag link for imparting steering movement to said wheels, of an attachment having dirigible wheels and a second drag link movable substantially longitudinally of said implement for imparting steering movement to said last named wheels, and means for imparting non-uniform motion to said second drag link as the first drag link moves uniformly.

2. The combination with a tractor having dirigible wheels and a drag link for imparting steering movement to said wheels, of an attachment having dirigible wheels and a second drag link for imparting steering movement to said last named wheels, and means for imparting decelerating motion to said second drag link as the first drag link moves uniformly.

3. The combination with a tractor having dirigible wheels and a drag link for imparting steering movement to said wheels, of an attachment having dirigible wheels and a second drag link for imparting steering movement to said last named wheels, and means including a rotatable arm movable through substantially 90° for imparting non-uniform motion to said second drag link as the first drag link moves uniformly.

4. The combination with a tractor having dirigible wheels and a drag link and a swinging arm actuated thereby for imparting steering movement to said wheels, of an attachment having dirigible wheels and a second drag link for imparting steering movement to said last named wheels, and means including ratio reduction means driven from said first swinging arm and a second swinging arm driven from said means for imparting decelerating motion to said second drag link as the first drag link moves uniformly.

5. The combination with a self-propelled vehicle having steering wheels and means for imparting steering movement to said wheels, and an attachment carried by said vehicle having dirigible wheels and means for differentially steering said dirigible wheels, of ratio reduction means having a common operator and two associated gear members of unequal radii driven therefrom and connected respectively with said steering wheels and said dirigible wheels, whereby the steering ratio of said dirigible wheel steering means is different from that of said steering wheels.

6. The combination with a self-propelled vehicle having steering wheels and means for imparting steering movement to said wheels, and an attachment carried by said vehicle having dirigible wheels and means for differentially steering said dirigible wheels, of means comprising a gear reduction mechanism having an operator in the form of a double gear and two associated gear members of unequal radii meshing with said double gear and driven therefrom, said gear members being connected, respectively, with said steering wheels and said dirigible wheels whereby the steering ratio of said dirigible wheel steering means is greater than that of said steering wheels.

7. The combination with a self-propelled vehicle having steering wheels and means for imparting steering movement to said wheels, and an attachment carried by said vehicle having dirigible wheels and means for differentially steering said dirigible wheels, of means for transmitting movement to both said dirigible and steering wheels comprising a gear reduction mechanism, a gear for operating said steering wheels, a gear for operating said dirigible wheel steering means, and a single means cooperating with both of said gears for actuating both of said operating gear means.

8. The combination with a self-propelled vehicle having steering wheels and means for imparting steering movement to said wheels, and an attachment carried by said vehicle having dirigible wheels and means for differentially steering said dirigible wheels, of means for transmitting movement to both said steering and dirigible wheels comprising a gear reduction mechanism, a spindle for imparting swinging movement to said steering wheels, means carried by said spindle and adapted to impart movement to said spindle, separate means carried by said spindle and adapted to impart movement to said dirigible wheel operating means, and a single means for imparting motion separately to each spindle carried means.

9. The combination with a self-propelled vehicle having steering wheels and means including a drag link for imparting swinging motion to said wheels, and an attachment associated with said vehicle having dirigible wheels and steering means including a second drag link for imparting swinging motion to said dirigible wheels, of gear reduction means associated with said vehicle steering wheels to transmit steering movement thereto at a given steering ratio and to concurrently transmit steering movement to said dirigible wheel steering means at a different steering ratio, and crank means associated with said dirigible wheel steering means and said gear reduction means for imparting non-uniform motion to said second drag link as the first drag link is moved with uniform motion.

10. A gear reduction mechanism for a combined tractor and an attachment, both having dirigible wheels, comprising a spindle for the tractor dirigible wheels, means carried by said spindle for imparting swinging motion to said spindle, means movably carried by said spindle for imparting swinging movement to the attachment wheels, and a single means for concurrently imparting differential motion to both said spindle carried means.

11. A gear reduction mechanism for combined tractor and an attachment, both having dirigible wheels, comprising a spindle for the tractor dirigible wheels, means carried by said spindle for imparting rotative motion to said spindle, means rotatably carried by said spindle for imparting swinging movement to the attachment wheels, and a single means for concurrently imparting motion to both said spindle carried means at different ratios.

12. A gear reduction mechanism for a combined tractor and an attachment, both having dirigible wheels, comprising a spindle for the tractor dirigible wheels, means carried by said spindle for imparting rotative motion to said spindle, means carried by said spindle for imparting swinging movement to the attachment wheels, said latter means being adapted to have relative movement with respect to said first named means, and a single means for concurrently imparting differential motion to both said spindle carried means.

13. A gear reduction mechanism for a combined tractor and an attachment, both having dirigible wheels, comprising a spindle for the tractor dirigible wheels, a gear sector carried by said spindle for imparting rotative motion to said spindle, a gear carried by said spindle and adapted to rotate thereon relative to said sector for imparting swinging movement to the attachment wheels, and a second sector having gear teeth adapted to mesh with both the first named sector and said gear for concurrently imparting motion thereto at different ratios.

14. The combination with a tractor having front steering wheels and a vertical spindle for steering the tractor steering wheels, of an implement propelled by the tractor and having dirigible wheels and steering mechanism therefor, a gear sector fixed to said spindle, a second gear sector rotatably mounted coaxially with the axis of said spindle and having a hub extension, an arm fixed to said hub extension, a link connecting said arm with the steering mechanism of the implement, a third gear sector mounted for rotation about an axis parallel to the axis of said spindle and having one set of teeth engaging the teeth of the first gear sector and another set of teeth engaging the teeth of the second gear sector, and means for rotating said third gear sector.

15. The combination with a tractor having front steering wheels and a spindle for steering the tractor steering wheels, of an implement propelled by the tractor and having dirigible wheels and steering mechanism therefor, gear means fixed to said spindle, a second gear means journaled on said spindle spaced from said first named gear means, an arm fixed on said second gear means, a link connecting said arm to the steering mechanism of the implement, a third gear means mounted for rotation about an axis parallel to the axis of said spindle and having toothed means engaging said first gear means and said second gear means, whereby said second gear means rotates at a different ratio from said second gear means, and means for rotating said third gear means.

16. The combination of a tractor having front steering wheels, an implement propelled by the tractor and having dirigible wheels and steering mechanism therefor, a spindle for steering the tractor steering wheels, a gear means fixed on said spindle having one radius, a second gear means journaled on said spindle having a different radius, an arm adapted to turn responsive to the rotation of said second gear means, a link connecting said arm with the steering mechanism of the implement, a member mounted for rotation about an axis parallel to the axis of said spindle and comprising toothed means of different radii adapted to operatively engage said first and second gear means for turning said implement dirigible wheels at a differen ratio of movement with respect to the turning movement of said tractor wheels, and means for actuating said member.

17. The combination of a tractor having front steering wheels, an implement propelled by the tractor and having dirigible wheels and steering mechanism therefor, a housing on said tractor, a spindle journaled in said housing, a gear sector fixed to said spindle, a gear rotatably mounted co-axially with the axis of said spindle, an arm fixed to said gear, a link connecting said arm with the steering mechanism of the implement, a member journaled in said housing spaced from said spindle and having toothed means thereon adapted to operatively engage said gear sector and gear, and means for rotating said member to transmit turning movement to both said steering and dirigible wheels.

18. The combination of a tractor having front steering wheels, an implement propelled by the tractor and having dirigible wheels and a steering mechanism therefor, a housing on said tractor, a spindle journaled in said housing, a gear means of one radius fixed to said spindle, a second gear means of a different radius journaled on an axis coaxially of said spindle, an arm fixed to said second gear means, link means connecting said arm with the steering mechanism of the implement, a member journaled in said housing spaced from said spindle and having toothed means thereon adapted to separately engage both said first and second gear means, and means for rotating said member to transmit different turning ratio to said dirigible wheels from that transmitted to said steering wheels.

19. The combination of a tractor having front steering wheels, an implement propelled by the tractor and having dirigible wheels and steering mechanism therefor, a housing on said tractor, a spindle journaled in said housing, a gear sector fixed to said spindle, a gear rotatably mounted in said housing, an arm fixed to said gear, a link connecting said arm with the steering mechanism of the implement, a member journaled in said housing spaced from said spindle and having toothed means thereon adapted to operatively engage said gear sector, means for rotating said member to transmit turning movement to said steering wheels, and means for rotating the gear simultaneously with said sector.

20. The combination of a tractor having front steering wheels, an implement propelled by the tractor and having dirigible wheels and a steering mechanism therefor, a housing on said tractor, a steering spindle journaled in said housing, a gear means of one radius fixed to said spindle, a second gear means of a different radius journaled in said housing, an arm fixed to said second gear means, link means connecting said arm with the steering mechanism of the implement, a member journaled in said housing spaced from said spindle and having toothed means thereon adapted to separately engage both said first and second gear means, and means for rotating said member to transmit different turning ratio to said dirigible wheels from that transmitted to said steering wheels.

21. The combination with a vehicle including dirigible wheels, of a frame having dirigible wheels and connected with the vehicle, and a steering connection between the dirigible wheels of the vehicle and the dirigible wheels of the frame and comprising a bell crank pivoted on the frame and having a forwardly projecting portion and a laterally extending portion, differentially shiftable connections between said forward portion of the bell crank and said dirigible wheels of the frame, and a longitudinally disposed drag link connected at one end with said laterally projecting portion and actuated by the steering of the vehicle dirigible wheels.

ELMER McCORMICK.